US012734534B2

(12) United States Patent
Huang

(10) Patent No.: US 12,734,534 B2
(45) Date of Patent: Sep. 15, 2026

(54) WATER FLOW CONTROL DEVICE WITH PRE-ADJUSTABLE OUTPUT

(71) Applicant: Tzu-Lin Huang, Lukang Township (TW)

(72) Inventor: Tzu-Lin Huang, Lukang Township (TW)

( * ) Notice: Subject to any disclaimer, the term of this patent is extended or adjusted under 35 U.S.C. 154(b) by 0 days.

(21) Appl. No.: 19/026,331

(22) Filed: Jan. 16, 2025

(65) Prior Publication Data

US 2025/0235884 A1 Jul. 24, 2025

(30) Foreign Application Priority Data

Jan. 23, 2024 (TW) ................................ 113102579

(51) Int. Cl.
*B05B 1/30* (2006.01)
*B05B 12/00* (2018.01)
*B05B 9/03* (2006.01)

(52) U.S. Cl.
CPC .......... *B05B 1/3026* (2013.01); *B05B 12/002* (2013.01); *B05B 9/03* (2013.01)

(58) Field of Classification Search
CPC .................. B05B 1/3026; B05B 1/326; B05B 12/002–0026; B05B 12/0024; B05B 12/0022; B05B 9/01; B05B 9/03
USPC ........ 251/205, 208, 209, 237–245, 320–324, 251/341, 346, 289; 239/526, 390–397, 239/436–460
See application file for complete search history.

(56) References Cited

U.S. PATENT DOCUMENTS

| | | | | | |
|---|---|---|---|---|---|
| 780,354 | A | * | 1/1905 | Keller | F16K 31/52408 251/240 |
| 891,284 | A | * | 6/1908 | Nethery et al. | F16K 21/16 251/48 |
| 3,780,949 | A | * | 12/1973 | Gavin | B05B 1/005 239/291 |
| 3,786,990 | A | * | 1/1974 | Hagfors | B05B 7/2437 239/117 |
| 4,202,497 | A | * | 5/1980 | Ten Pas | B29B 7/7438 239/401 |
| 4,396,156 | A | * | 8/1983 | Southworth | H10P 72/0406 239/DIG. 19 |
| 5,287,887 | A | * | 2/1994 | Hengesbach | B05B 12/002 239/528 |
| 5,971,956 | A | * | 10/1999 | Epstein | A61M 1/7413 604/35 |

(Continued)

*Primary Examiner* — Craig J Price

(57) ABSTRACT

The present invention discloses a water flow control device with pre-adjustable output, comprising: a housing assembly with water inlet and outlet channels in an offset configuration and a flow regulation chamber between them; a rotatable and axially movable control shaft within the flow regulation chamber, including a front section, a rear section, a terminal end, and a flow modulation section; seal rings on the front and rear sections and adjacent to the rear end of the flow modulation section, interacting with a sealing interface surface to stop water flow in the forward position; a reset mechanism biasing the control shaft forward; an external rotary knob-type flow adjustment mechanism for precise water flow modulation; and a pivotally mounted trigger handle on the housing assembly with an actuating surface engaging the front section of the control shaft for intuitive operation.

5 Claims, 5 Drawing Sheets

(56) References Cited

U.S. PATENT DOCUMENTS 5,984,207 A * 11/1999 Wang .................... B05B 1/3013 239/526
6,234,192 B1 * 5/2001 Esche ................ B65H 75/4478 251/114
6,247,929 B1 * 6/2001 Bachman ........... A61C 17/0202 433/80
6,626,382 B1 * 9/2003 Liu ........................... B05B 7/12 239/296
6,644,625 B1 * 11/2003 Jacobs ................ B05B 12/0024 251/309
6,702,206 B2 * 3/2004 Wu ....................... B05B 1/3013 239/525
7,150,415 B2 * 12/2006 Weaver ............... B05B 12/0024 239/443
7,694,893 B2 * 4/2010 Zittel ................ B01F 33/50114 239/117
8,152,078 B2 * 4/2012 Jianglin ................ B05B 1/3013 239/528
8,381,769 B2 * 2/2013 Hsieh .................... B05B 1/3026 137/614.19
8,424,781 B2 * 4/2013 Rosko ................... B05B 1/3013 239/528
8,448,667 B2 * 5/2013 Meehan ................ E03C 1/0404 137/637.1
8,496,190 B2 * 7/2013 Chen ......................... B05B 9/01 239/394
8,662,470 B2 * 3/2014 Klecker ................ A61M 39/24 137/625.3
8,844,845 B2 * 9/2014 Chen ....................... B05B 1/005 239/525
9,726,456 B1 * 8/2017 Jhu ....................... B05B 12/002
10,940,498 B2 * 3/2021 Fideler .............. F16K 31/52425
12,544,784 B2 * 2/2026 Chung .................... B05B 15/65
2004/0222320 A1 * 11/2004 Wu ....................... B05B 1/3013 239/526
2007/0057092 A1 * 3/2007 Huang .................. B05B 7/1209 239/527
2008/0245900 A1 * 10/2008 Chih ..................... B05B 1/3013 239/526
2012/0012676 A1 * 1/2012 Hu ........................ B05B 1/1663 239/525
2012/0091225 A1 * 4/2012 Chen ..................... B05B 15/528 239/106

* cited by examiner

WATER FLOW CONTROL DEVICE WITH PRE-ADJUSTABLE OUTPUT

FIELD OF INVENTION

The present invention relates to the field of water jet control mechanisms, in particular to an innovative water flow control device enables intuitive operation and pre-adjustable output functionality.

BACKGROUND OF THE INVENTION

Conventional water gun control systems often have an operating mechanism in which the direction of actuation is parallel to, but opposite to, the direction of water discharge. This design requires overcoming both the spring force of a reset mechanism and the resistance of water pressure during operation. Such configurations present significant challenges to users, particularly in applications requiring synchronized flow adjustments. Sudden fluctuations in water pressure during opening and closing of the flow further can increase operational difficulties and reduce comfort.

In view of these limitations, there is an obvious need for a novel solution that can enhance practical utility and operational efficiency. The present invention fulfills this gap by introducing an innovative design aimed at minimizing user effort and optimizing flow control. Drawing upon extensive expertise in product development and manufacturing, the inventor has carefully designed and evaluated the present invention to achieve these objectives, resulting in a device that significantly improves user experience and functionality.

SUMMARY OF THE INVENTION

The main purpose of the present invention is to provide a water flow control device equipped with a pre-adjustable output functionality. The present invention addresses the critical technical issues by introducing a water jet control mechanism that combines advanced operational efficiency, user-oriented functionality, and innovative structural design.

In order to achieve this purpose, the present invention comprises the following technical features which together solve the identified issues:

A housing assembly comprises a water inlet channel and a water outlet channel, with a flow regulation chamber interposed between them. This flow regulation chamber is configured as a linear structure extending along a central axis, with openings at both its front and rear ends. The water inlet and outlet channels are offset relative to one another, and the flow regulation chamber intersects and communicates with the water inlet channel, forming an integrated flow path. A control shaft is accommodated within the flow regulation chamber and is capable of both rotational and axial movement. Structurally, this shaft comprises a front section, a rear section, a rear terminal end, and a flow modulation section positioned between the front and rear sections. The front section extends outward through the front opening, while the rear section aligns with and extends through the rear opening. The flow modulation section aligns with the region between the water inlet and outlet channels and provides dynamic flow modulation. During operation, the control shaft 20 can be operated between a forward position and a backward position. A front seal ring is mounted on the front section of the control shaft to achieve a watertight interface with the flow regulation chamber. Similarly, a rear seal ring is mounted on the rear section to achieve a watertight seal with the flow regulation chamber. In addition, an intermediate seal ring is installed adjacent to the rear end of the flow modulation section, with the rear seal ring located between the intermediate seal ring and the rear terminal end of the control shaft. When the control shaft is advanced to its forward position, the intermediate seal ring closes the water outlet channel, creating a water-sealed state. Conversely, when the shaft is retracted to its backward position, it forms a water-flowing state where the water inlet channel communicates with the water outlet channel. A reset mechanism is incorporated at a corresponding position on the control shaft, providing an automatic restoring force that biases the shaft toward the front opening. A flow adjustment mechanism, mounted at the rear section of the control shaft, facilitates rotational adjustment of the angle of the flow modulation section, thereby regulating the water flow rate. The device also incorporates a trigger handle, which is pivotally mounted to the housing assembly. This trigger has an actuating surface that engages the front section of the control shaft.

The principal effects and advantages of the present invention are achieved by the design of the intersecting communication between the flow regulation chamber and the water inlet channel. This structural innovation enables the control shaft to dynamically interact with the water flow path, thereby significantly mitigating the resistance imposed by the water pressure during the opening and closing of the flow. As a result, users can experience an efficient and intuitive operation. This configuration not only optimizes utility and operational performance, but also substantially enhances industrial applicability and end-user satisfaction.

DETAILED DESCRIPTION OF THE PREFERRED EMBODIMENTS

FIGS. 1 to 6 provide a detailed illustration of a preferred embodiment of the water flow control device equipped with pre-adjustable output functionality as disclosed in the present invention. This embodiment, however, is provided for illustrative purposes only and do not limit the scope of the patent application to the specific structures shown.

Figure 3:
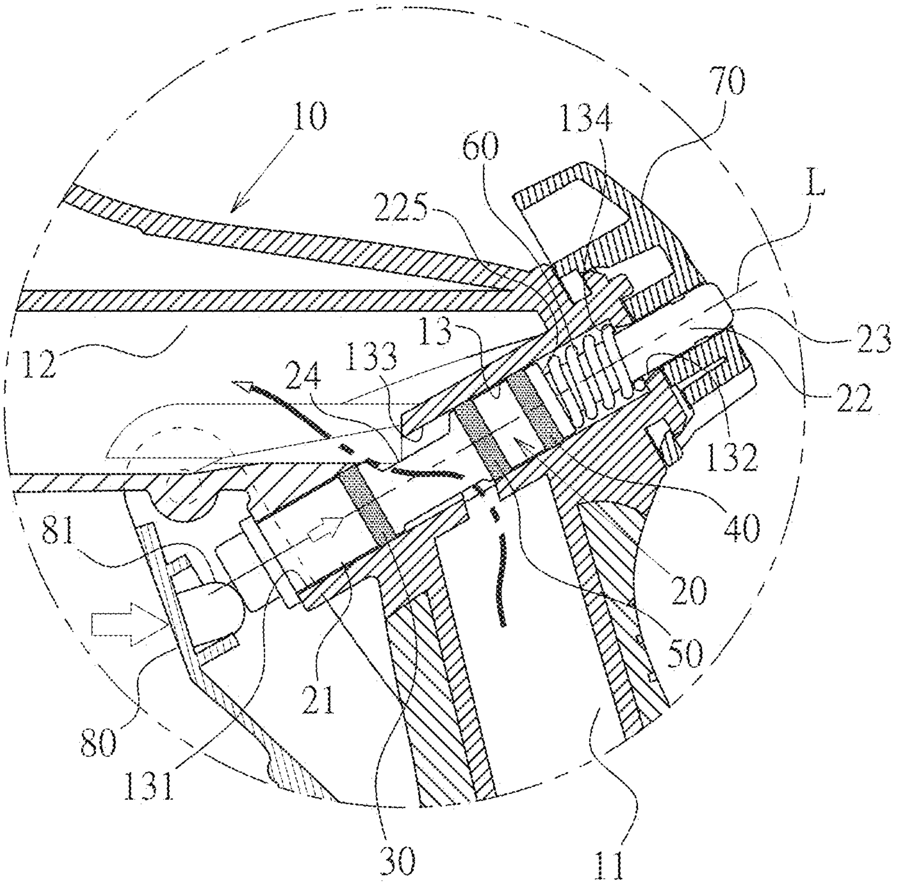
FIG. 3 is a first partial sectional view of the preferred embodiment with the control shaft in its backward position.
Figure 4:
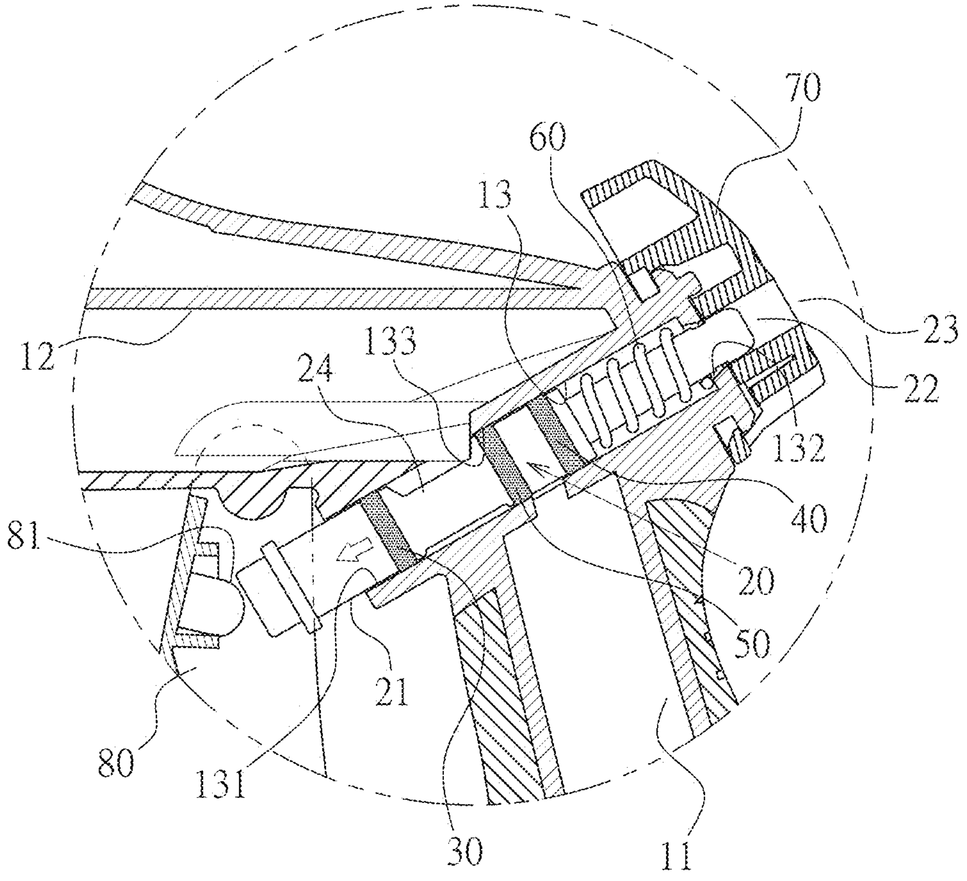
FIG. 4 is a second partial sectional view of the preferred embodiment with the control shaft in its forward position.

The water flow control device with pre-adjustable output comprises the following components: A housing assembly 10, which incorporates a water inlet channel 11 and a water outlet channel 12, with a flow regulation chamber 13 interposed between these channels. The flow regulation chamber 13 is configured as a linear structure extending along a central axis L, with a front opening 131 and a rear opening 132 at both ends. The water inlet channel 11 and water outlet channel 12 are offset relative to one another, and the flow regulation chamber 13 intersects and communicates with the water inlet channel 11, forming an integrated flow path. A control shaft 20 is accommodated within the flow regulation chamber 13 and is capable of both rotational and axial movement. Structurally, this shaft 20 comprises a front section 21, a rear section 22, a rear terminal end 23, and a flow modulation section 24 positioned between the front section 21 and the rear section 22. The front section 21 extends outward through the front opening 131, while the rear section 22 aligns with and extends through the rear opening 132. The flow modulation section 24 aligns with the region between the water inlet channel 11 and the water outlet channel 12, enabling precise regulation of the water flow. During operation, the control shaft 20 can be operated between a forward position and a backward position. A front seal ring 30 is mounted on the front section 21 of the control shaft 20 to achieve a watertight interface with the flow regulation chamber 13. Similarly, a rear seal ring 40 is mounted on the rear section 22 to achieve a watertight seal with the flow regulation chamber 13. In addition, an intermediate seal ring 50 is installed adjacent to the rear end of the flow modulation section 24, with the rear seal ring 40 located between the intermediate seal ring 50 and the rear terminal end 23 of the control shaft 20. When the control shaft 20 is advanced to its forward position, as shown in FIG. 4, the intermediate seal ring 50 closes the water outlet channel 12, creating a water-sealed state. Conversely, when the shaft 20 is retracted to its backward position, as shown in FIG. 3, it forms a water-flowing state where the water inlet channel 11 communicates with the water outlet channel 12. A reset mechanism 60 is incorporated at a corresponding position on the control shaft 20, providing an automatic restoring force that biases the shaft 20 toward the front opening 131. A flow adjustment mechanism 70, mounted at a corresponding position of the control shaft, facilitates rotational adjustment of the angle on the flow modulation section, thereby regulating the water flow rate. Finally, a trigger handle 80 is pivotally mounted to the housing assembly 10 and includes an actuating surface 81 which engages the front section 21 of the control shaft 20.

As shown in FIG. 4, in this embodiment, the flow regulation chamber 13 is also provided with a sealing interface surface 133 located between the water inlet channel 11 and the water outlet channel 12. In the forward position of the control shaft 20, the intermediate seal ring 50 interfaces with the sealing interface surface 133, creating a water-sealed state that stops the water flow.

FIG. 4 further illustrates that the front seal ring 30, the rear seal ring 40, and the intermediate seal ring 50 are designed to have identical outer diameters. This dimensional consistency allows the flow regulation chamber 13 to assume a cylindrical shape with a uniform inner diameter. Such a streamlined configuration not only simplifies the mold design and enables unidirectional drafting of the mold, but also significantly reduces manufacturing complexity and cost, thereby optimizing industrial productivity and economic feasibility.

As shown in FIG. 3, in this embodiment, the rear opening 132 of the flow regulation chamber 13 is characterized by a constricted contour that defines an end wall 134. This configuration corresponds to a shoulder 225 formed on the rear section 22 of the control shaft 20. The design of these components facilitates the secure placement of the reset mechanism 60 (typically in the form of a spiral spring), which is supported between the shoulder 225 and the end wall 134.

Figure 1:
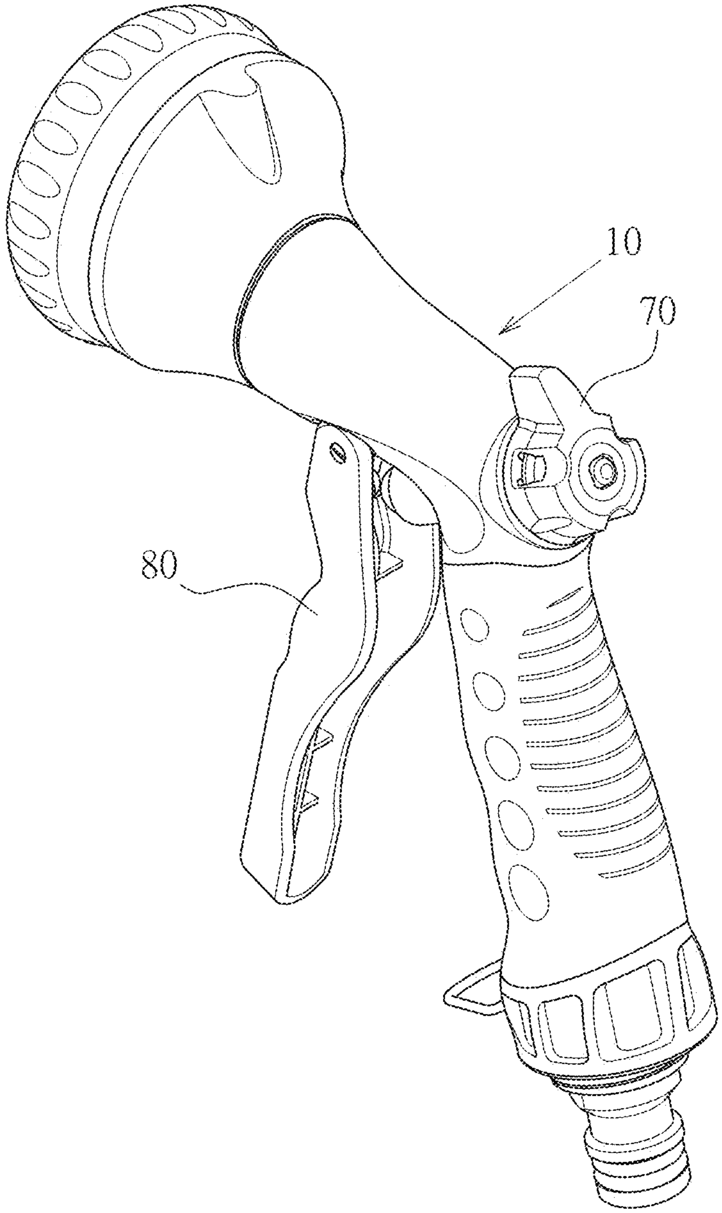
FIG. 1 is a perspective view of a preferred embodiment of the present invention.
Figure 2:
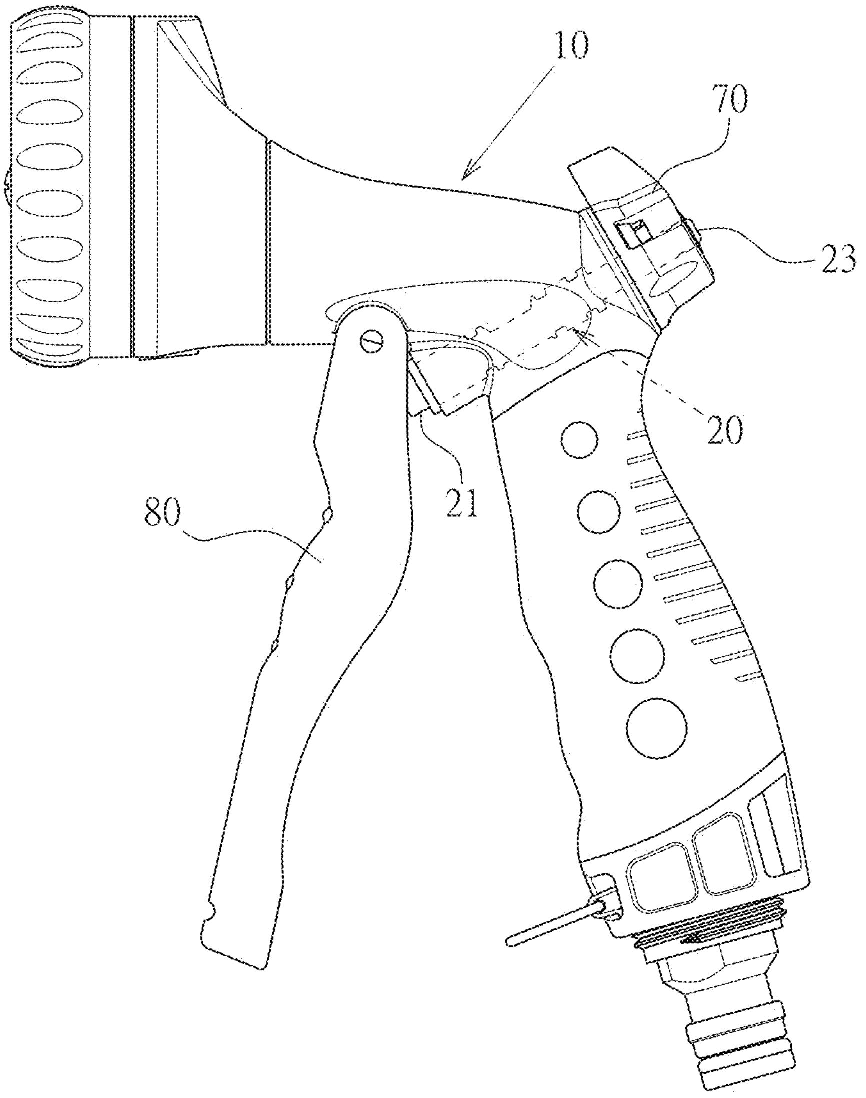
FIG. 2 is a side view of the preferred embodiment.

As shown in FIGS. 1 and 3, in this embodiment, the flow adjustment mechanism 70 is configured as an external rotary knob mounted on the housing assembly 10.

Figure 5:
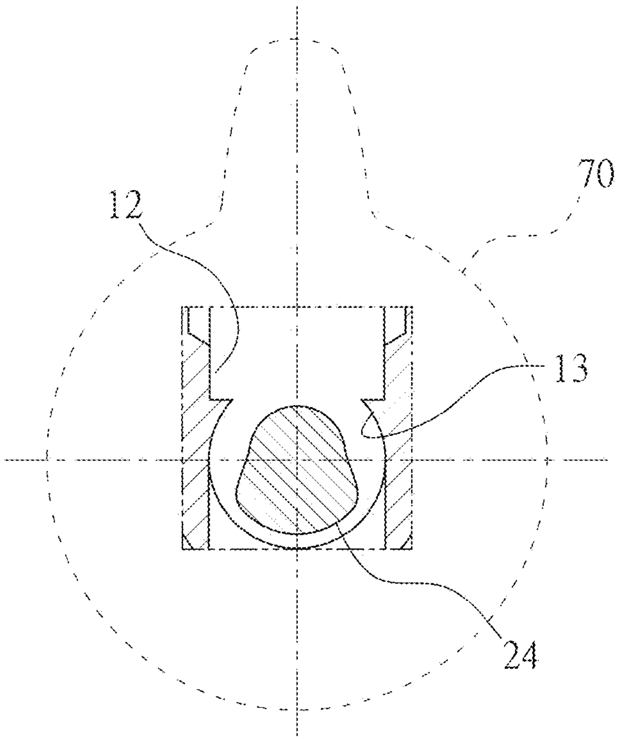
FIG. 5 is a first flow control state diagram of the preferred embodiment.
Figure 6:
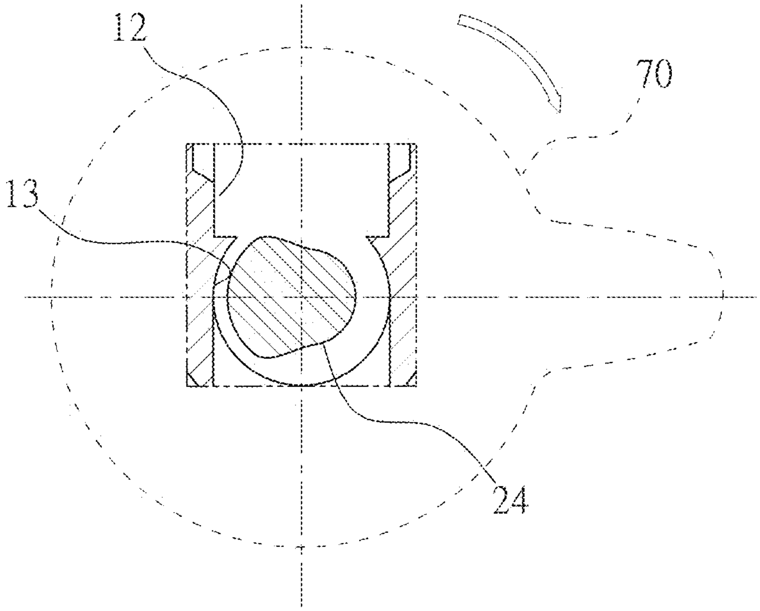
FIG. 6 is a second flow control state diagram of the preferred embodiment.

By integrating the aforementioned structural elements and technical features, the water flow control device with pre-adjustable output, as shown in FIGS. 3 and 4, achieves an innovative intersecting communication between the flow regulation chamber 13 and the water inlet channel 11. This configuration allows the operation of the control shaft 20 to dynamically intersect with the water flow path. As a result, the user encounters minimal resistance from water pressure when opening and closing the water flow, allowing for intuitive and effortless operation. In addition, the pre-adjustable flow functionality, as shown in FIGS. 5 and 6, is realized by rotationally adjusting the flow modulation section 24 via the flow adjustment mechanism 70. This mechanism allows the water flow rate to be pre-adjusted, thereby increasing the versatility and user adaptability of the device.

What is claimed is:

1. A water flow control device with pre-adjustable output, comprising:

a housing assembly, comprising a water inlet channel and a water outlet channel, with a flow regulation chamber interposed between them; the flow regulation chamber is configured as a linear structure extending along a central axis and includes a front opening and a rear opening; the water inlet channel and the water outlet channel are arranged in an offset configuration, and the flow regulation chamber intersects and communicates with the water inlet channel;

a control shaft, accommodated within the flow regulation chamber, configured to be rotatable and axially movable, comprising a front section extending through the front opening, a rear section aligned with the rear opening, a rear terminal end, and a flow modulation section positioned between the front and rear sections, wherein the flow modulation section aligns with a region between the water inlet and outlet channels, and the control shaft is operable in a forward position and a backward position, providing dynamic modulation of a water flow rate during use;

a front seal ring, mounted on the front section of the control shaft to achieve a watertight seal with the flow regulation chamber;

a rear seal ring, mounted on the rear section of the control shaft to achieve a watertight seal with the flow regulation chamber;

an intermediate seal ring, installed adjacent to the rear end of the flow modulation section, with the rear seal ring located between the intermediate seal ring and the rear terminal end of the control shaft, wherein when the control shaft is in the forward position, the intermediate seal ring closes the water outlet channel in a water-sealed state, and when in the backward position, the control shaft forms a water-flowing state where the water inlet channel communicates with the water outlet channel;

a reset mechanism, incorporated at a corresponding position on the control shaft to provide an automatic restoring force that biases the shaft toward the front opening;

a flow adjustment mechanism, mounted at a corresponding position on the control shaft to rotationally adjust an angle of the flow modulation section, thereby regulating the water flow rate; and a trigger handle, pivotally mounted on the housing assembly, having an actuating surface that engages the front section of the control shaft.

2. The water flow control device with pre-adjustable output according to claim 1, wherein the flow regulation chamber incorporates a sealing interface surface located between the water inlet channel and the water outlet channel, such that when the control shaft moves to the forward position, the intermediate seal ring interfaces with the sealing interface surface, thereby creating a water-sealed state that stops the water flow.

3. The water flow control device with pre-adjustable output according to claim 1, wherein the front seal ring, the rear seal ring, and the intermediate seal ring are designed to have identical outer diameters.

4. The water flow control device with pre-adjustable output according to claim 1, wherein the rear opening of the flow regulation chamber forms a constricted contour that defines an end wall, and the rear section of the control shaft correspondingly forms a shoulder, facilitating the secure placement of the reset mechanism which is supported between the shoulder and the end wall.

5. The water flow control device with pre-adjustable output according to claim 1, wherein the flow adjustment mechanism is configured as an external rotary knob mounted on the housing assembly.

* * * * *